Figure 1:
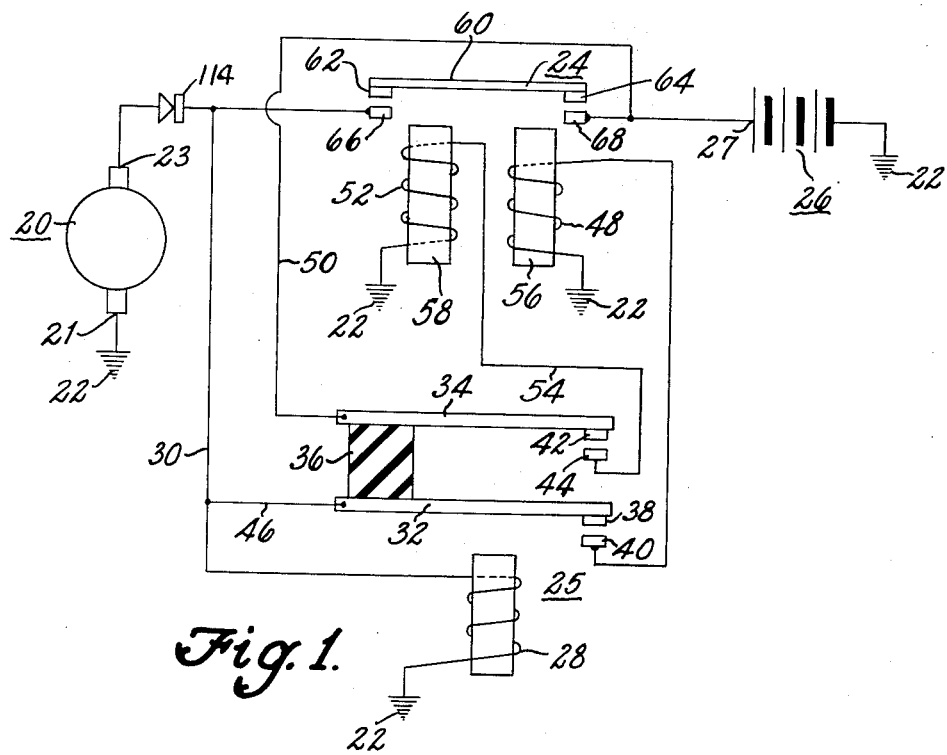

INVENTOR.
LYMAN A. RICE

BY

ATTORNEY

United States Patent Office 2,766,418
Patented Oct. 9, 1956

2,766,418

BATTERY CHARGING SYSTEM

Lyman A. Rice, Anderson, Ind., assignor to General Motors Corporation, Detroit, Mich., a corporation of Delaware Application March 26, 1954, Serial No. 418,840

6 Claims. (Cl. 320—25)

This invention relates to generator circuits and particularly to a D. C. generator battery charging system for use in vehicles wherein a storage battery may be incorrectly connected.

It is an object of the present invention to eliminate generator and/or current voltage regulator failures in a battery charging system which result when the polarity of the battery and the generator in the charging circuit is not in agreement.

It is another object of the present invention to eliminate failures in a D. C. generator and a current and voltage regulator therefor which results when the battery which the generator is to charge, is incorrectly connected in the system.

In carrying out the above objects, a more specific object is to provide a relay in a battery charging system that is in response to the battery and generator voltage to close a charging circuit between the generator and battery when the polarity of the generator and battery in the circuit is in agreement and to maintain the circuit open when the polarity thereof is reversed.

Difficulties are frequently encountered when a battery is connected in a circuit with the generator in a charging system with its polarity reversed from that of the generator. This incorrect connection frequently occurs when motor vehicles are stored and when an external power supply is used for starting, or when batteries are initially installed incorrectly. In instances when the battery and generator do not agree, and no provision is made to correct the same before starting, it has been found that the current and voltage regulator cut-out relay contacts weld together so that the battery will discharge through the generator armature after the engine has ceased to operate. This frequently results in damage to either or both the generator and the current and voltage regulator. It is to the elimination of the above difficulties that the present invention is directed.

Further objects and advantages of the present invention will be apparent from the following description, reference being hand to the accompanying drawing wherein a preferred embodiment of the present invention is clearly shown.

In the drawing:

Figure 1 diagrammatically shows one embodiment according to the present invention in a D. C. generator battery charging system.

Figure 2:
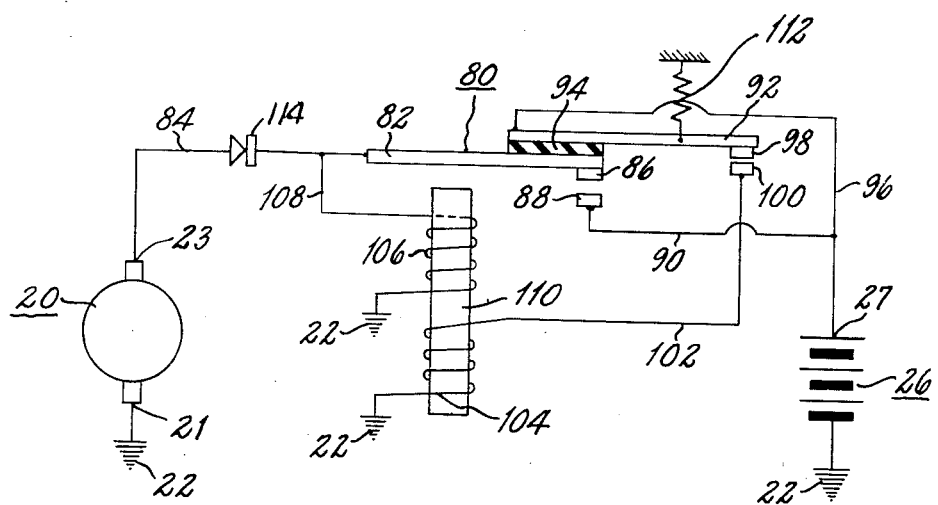

Figure 2 diagrammatically shows another embodiment according to the present invention in a D. C. generator battery charging system.

In the drawings and in Figure 1 particularly, the generator 20 has one of its output terminals 21 grounded at 22 and the other output terminal 23 connected in a battery charging circuit through a relay 24, as will be hereinafter described, with one of the terminals 27 of a battery 26 that has the other terminal grounded at 22. A coil 28 of an actuating relay 25 by having one end connected through lead 30 to the output terminal 23 of generator 20 and the other end connected to ground 22 is responsive to the potential of generator 20 and when excited will attract movable armatures 32 and 34 which are separated and insulated from each other by an insulating block 36. The armatures 32 and 34 are normally biased by a spring, not shown, so that the movable contact 38 as carried by a movable armature 32 will be out of contact with a stationary contact 40 and the movable contact 42 as carried by armature 34 will be separated from stationary contact 44.

As is further seen from the drawing, the armature 32 is electrically connected through leads 46 and 30 with the output terminal 23 of generator 20 so that when the coil 28 causes contacts 38 and 40 to close, the potential and polarity of generator 20 will be impressed across a coil 48 of relay 24 as coil 48 has one end connected with contact 40 and the other end connected with ground 22. The armature 34 is electrically connected through lead 50 to the battery side of relay 24 and when contacts 42 and 44 close, the coil 52, which has one end connected through lead 54 with the stationary contact 44 and the other connected to ground 22, will be energized in response to the potential of the battery.

If for the purposes of illlustration it is assumed the output terminal 21 of generator 20 and the grounded terminal of battery 26 are both negative, as shown, the generator and battery will be correctly connected in a battery charging circuit and the polarity of the generator 20 and battery 26 will be in agreement. When this condition is present the winding 48 which is wound on core 56 will aid the attraction of winding 52 as wound on core 58 to move armature 60 which carries movable contacts 62 and 64 into engagement with stationary contacts 66 and 68 respectively which in turn are connected with the output terminal 23 of generator 20 and the terminal of battery 26 so that the circuit between the generator 20 and battery 26 is closed.

When the generator 20 and battery 26 are incorrectly connected in the battery charging system, as when either the generator 20 or battery 26 are reversed relative to the other from that heretofore described, the magnetic attraction of the windings 48 and 52 will be in opposition to and cancel the magnetic attraction of each other and the armature 60 of the actuating relay will not be moved to close the contacts 62, 64, 66 and 68 and the charging circuit between generator 20 and battery 26 will not be made and damage will not result to the generator or current and voltage regulators, not shown.

In Figure 2, the generator 20 has one of its output terminals 21 connected with ground 22 and another output terminal 23 connected through a relay 80 with one terminal 27 of a battery 26 that has its other terminal grounded at 22. The relay 80 has a movable armature 82 that is electrically connected through lead 84 with the output terminal 23 of the generator 20 and carries a movable contact 86 that is adapted to engage a stationary contact 88 connected through lead 90 to terminal 27 of battery 26. A second movable armature 92, carried by and insulated from movable armature 82 by an insulating block 94, is electrically connected through a lead 96 with terminal 27 of battery 26 and carries a movable contact 98 which is adapted to engage a stationary contact 100 that is electrically connected through lead 102 to one end of a relay coil 104 that has its other end connected to ground 22 so that relay coil 104 is responsive to the polarity and potential of battery 26. A second relay coil 106 has one end connected through leads 108 and 84 with the output terminal 23 of generator 20 and the other end connected to ground 22 so that it is responsive to the polarity and potential as produced by generator 20.

The relay coils 104 and 106 are so wound on a common core 110 that their attractive force on armatures 82 and 92 will be additive when the generator 20 and battery 26 are connected in a charging circuit with their polarity in agreement as heretofore described. The winding 106 when energized by the output of generator 20 has sufficient attraction on armature 80 to overcome the force of spring 112 and cause contacts 98 and 100 to close prior to the closing of contacts 86 and 88. Thus the battery will be connected through lead 96, armature 92, contacts 98 and 100, and lead 102 to winding 104 whereby the potential of the battery is placed across and energizes the winding 104 which aids the attraction of winding 106 and causes armature 82 to move and close contacts 86 and 88 and complete the charging circuit which includes lead 84, armature 82, contacts 86 and 88 and lead 90.

In the event the polarity of the generator and battery does not agree, the closing of contacts 98 and 100 will cause the attraction of coil 104 to cancel that of coil 106 and armature 82 will not move sufficiently to close contacts 86 and 88 but will vibrate without completing the charging circuit through contacts 86 and 88.

Further various types and sizes of compatible generators and batteries may be used in a battery charging system that may include a current and voltage regulator similar to that disclosed in patent application Ser. No. 418,839 as filed by Charles W. King, concurrently filed herewith and assigned to the assignee of the present invention, now Patent No. 2,711,504, issued June 21, 1955.

It is readily apparent that the circuit breaker relay 24 in the embodiment shown in Figure 1 and the relay 80 as shown in Figure 2 may be used in place of and function as a standard cutout relay and when so included in the battery charging circuit will complete the charging circuit if the actuating coils 106 and 28 are of a size sufficient to move an armature in opposition held by a spring after the potential of the generator has reached a given value, and in this connection it is readily apparent in the embodiments described the battery and generator will be connected in a circuit with each other whenever the polarity thereof is in agreement as heretofore set forth. Manifestly it is possible that in some instances, both the battery and generator might be incorrectly installed in the circuit and damage might result to various other pieces of electrical equipment in the circuit if the generator was to charge the battery under these conditions. This situation may be readily remedied by including a rectifier 114 of a suitable type in the circuit between the actuating relay core and the generator output terminal so that the relay will not be excited unless the generator output is of the proper polarity.

While the embodiment of the present invention as herein described constitutes a preferred form it is to be understood that other forms might be adopted.

What is claimed is as follows:

1. In a battery charging system, the combination comprising; a storage battery, a D. C. generator in a charging circuit with said storage battery, and means in said circuit responsive to the polarity of said generator and battery for preventing closing of said charging circuit when the polarity between said generator and battery is reversed.

2. In a battery charging system, the combination comprising; a storage battery, a D. C. generator arranged to charge said battery through a circuit, and means responsive to the polarity of the generator and battery for maintaining said charging circuit open when the polarity of the generator and battery are incorrectly connected in said charging circuit.

3. In a battery charging system, the combination comprising; a storage battery, a generator arranged to charge said battery through a charging circuit, a relay arranged to open and close said circuit in response to the potential of said generator and battery, said relay including a coil in circuit with and arranged to be energized in response to the potential of said generator, a second coil in circuit with and energized in response to the polarity of said battery, an armature arranged to be attracted by and moved when either of said coils is energized, a pair of contacts associated with said armature arranged to close and make a circuit between said source and battery when said armature is moved by the attraction of both of said coils and the polarity of said generator and battery in said circuit is in agreement, a movable contact insulated from and carried by said armature and arranged to move into contact with a stationary contact when said armature is moved, said movable and stationary contacts being arranged to engage each other, when said armature is moved, and connect said battery with said second coil whereby said second coil is energized in response to the potential of said battery and opposes the attraction of said armature for maintaining said first mentioned pair of contacts open whenever the polarity of said generator and battery in said circuit is in disagreement.

4. In a battery charging system, the combination comprising; a storage battery, a generator arranged to charge said battery through a charging circuit, a relay arranged to open and close said circuit in response to the polarity of said generator and battery, said relay including; a first coil in circuit with and arranged to be energized in response to the potential of said generator, a second coil in circuit with and energized in response to the potential of said generator, a third coil arranged to be circuited with and energized in response to the potential of said battery, a first armature arranged to be attracted by and moved when said first coil is energized by said generator for closing a circuit between said generator and said second coil, a second movable armature arranged to be attracted by and moved when said first coil is energized by said generator for connecting said third coil with said battery, and a third armature arranged to be attracted and moved by said second and said third coils when the polarity of said battery and generator in said charging circuit is in agreement for closing a circuit therebetween and arranged to maintain said circuit open when the polarity of said batttery and said generator in said charging circuit is in disagreement.

5. In a battery charging system, the combination comprising; a storage battery, a D. C. generator arranged to charge said battery through a circuit, and means including a pair of coil windings that are respectively responsive to the polarity of the generator and battery for maintaining said charging circuit open when the polarity of the generator and battery are incorrectly connected in said charging circuit.

6. In a battery charging system, the combination comprising; a storage battery, a D. C. generator in a charging circuit with said storage battery, and means including a pair of coil windings that are respectively responsive to the polarity of said generator and battery for preventing closing of said charging circuit when the polarity between said generator and battery is reversed.

References Cited in the file of this patent

UNITED STATES PATENTS 2,427,719    Exner                Sept. 23, 1947